(12) United States Patent
Borissov (10) Patent No.: US 7,451,942 B2
(45) Date of Patent: Nov. 18, 2008

(54) DIRECT FUEL INJECTOR ASSEMBLY FOR A COMPRESSIBLE NATURAL GAS ENGINE

(75) Inventor: Anatoli A. Borissov, Sugarland, TX (US)

(73) Assignee: Digicon, Inc., Craley, PA (US)

( * ) Notice: Subject to any disclaimer, the term of this patent is extended or adjusted under 35 U.S.C. 154(b) by 1151 days.

(21) Appl. No.: 10/689,319

(22) Filed: Oct. 20, 2003

(65) Prior Publication Data

US 2005/0082393 A1   Apr. 21, 2005

(51) Int. Cl.
  *F02M 61/00*  (2006.01)
(52) U.S. Cl. ............... 239/533.12; 239/533.3; 239/584; 239/589; 239/533.7; 123/527; 60/39.465
(58) Field of Classification Search .............. 239/533.3, 239/533.12, 548, 567, 584, 589, 589.1, 600, 239/DIG. 3, 453, 533.7; 123/299, 525, 526, 123/527, 528, 529; 60/39.465, 39.49, 39.77, 60/248

See application file for complete search history.

(56) References Cited

U.S. PATENT DOCUMENTS

| | | | |
|---|---|---|---|
| 3,628,726 A | 12/1971 | Johnson et al. |
| 4,006,719 A | 2/1977 | Kanda et al. |
| 4,094,469 A | 6/1978 | Waringer et al. |
| 4,338,897 A | 7/1982 | Crumheller et al. |
| 4,341,395 A | 7/1982 | Miller et al. |
| 4,383,198 A | 5/1983 | Hosking et al. |
| 4,825,828 A | 5/1989 | Schlunke et al. |
| 5,054,456 A | 10/1991 | Rush, II et al. |
| 5,150,690 A | 9/1992 | Carter et al. |
| 5,211,145 A | 5/1993 | Ichikand et al. |
| 5,222,993 A | 6/1993 | Crane et al. |
| 5,241,930 A | 9/1993 | Dupler et al. |
| 5,285,756 A | 2/1994 | Squires et al. |
| 5,295,816 A | 3/1994 | Kobayash et al. |
| 5,441,234 A | 8/1995 | White et al. |
| 5,542,392 A | 8/1996 | Povinger et al. |
| 5,549,083 A | 8/1996 | Feuling |
| 5,566,712 A | 10/1996 | White et al. |
| 5,611,316 A | 3/1997 | Oshima et al. |
| 5,630,403 A | 5/1997 | Van Kampen et al. |
| 5,639,022 A | 6/1997 | Yanta et al. |
| 5,666,923 A | 9/1997 | Collier et al. |
| 5,673,673 A | 10/1997 | Beck et al. |
| 5,697,346 A | 12/1997 | Beck et al. |

(Continued)

FOREIGN PATENT DOCUMENTS

EP   0 370 195 A1   5/1990

(Continued)

*Primary Examiner*—Steven J Ganey
(74) *Attorney, Agent, or Firm*—McNees Wallace & Nurick, LLC (57) ABSTRACT

This invention relates to the injection of compressible gaseous fuel directly into the combustion chamber of a reciprocating piston-type internal combustion engine. In particular, the invention provides apparatus and methods for low-pressure, high-speed direct injection of compressed natural gas into a combustion chamber of an engine. Using the present invention, relatively low intake pressures of about 50 to about 150 PSIG yield high-speed (sonic and supersonic) gas flow through the diverging nozzle portion for injection into the combustion chamber. Preferably, the gas reaches supersonic velocity, approaching Mach 1.5 to 2.5.

24 Claims, 7 Drawing Sheets

U.S. PATENT DOCUMENTS

| | | | |
|---|---|---|---|
| 5,713,336 A | 2/1998 | King et al. | |
| 5,752,481 A | 5/1998 | Faulkner et al. | |
| 5,758,865 A | 6/1998 | Casey et al. | |
| 5,775,289 A | 7/1998 | Yoshida et al. | |
| 5,787,864 A | 8/1998 | Collier et al. | |
| 5,820,102 A | 10/1998 | Borland et al. | |
| 5,829,418 A | 11/1998 | Tamura et al. | |
| 5,878,730 A | 3/1999 | Williams et al. | |
| 5,887,567 A | 3/1999 | White et al. | |
| 5,899,194 A | 5/1999 | Iwatsuku et al. | |
| 6,026,787 A | 2/2000 | Sun et al. | |
| 6,035,822 A | 3/2000 | Suziki et al. | |
| 6,073,862 A | 6/2000 | Touchette et al. | |
| 6,089,170 A | 7/2000 | Conti et al. | |
| 6,102,299 A | 8/2000 | Pace et al. | |
| 6,112,513 A | 9/2000 | Catt et al. | |
| 6,161,783 A | 12/2000 | Press et al. | |
| 6,196,204 B1 | 3/2001 | Janach et al. | |
| 6,328,231 B1 | 12/2001 | Ording et al. | |
| 6,336,437 B1 | 1/2002 | Baika et al. | |
| 6,360,963 B2 * | 3/2002 | Popp | 239/533.12 |
| 6,409,096 B2 | 6/2002 | Podd et al. | |
| 6,427,670 B2 | 8/2002 | Goto et al. | |
| 6,463,907 B1 | 10/2002 | Hiltner et al. | |
| 6,484,699 B2 * | 11/2002 | Paul et al. | 123/525 |
| 6,518,763 B2 | 2/2003 | Sollart | |
| 6,604,695 B1 * | 8/2003 | Parish | 239/533.12 |
| 6,626,381 B2 * | 9/2003 | Parrish | 239/533.7 |
| 6,764,028 B2 * | 7/2004 | Mills et al. | 239/533.3 |
| 2001/0025892 A1 | 10/2001 | McCoy et al. | |

FOREIGN PATENT DOCUMENTS

| | | |
|---|---|---|
| EP | 0 420 599 A2 | 4/1991 |
| JP | 55-49566 | 4/1980 |
| JP | 60-8456 | 1/1985 |
| RU | 2155422 C1 | 8/2000 |
| WO | WO 83/00191 | 1/1983 |
| WO | WO 87/00584 | 1/1987 |
| WO | WO 92/05363 | 4/1992 |
| WO | WO 02/02932 A1 | 1/2002 |

* cited by examiner

DIRECT FUEL INJECTOR ASSEMBLY FOR A COMPRESSIBLE NATURAL GAS ENGINE

FIELD OF THE INVENTION

This invention relates to the injection of gaseous fuel directly into the combustion chamber of a compressible gas-fueled engine. In particular, the invention provides apparatus and methods for low-pressure, high-speed direct injection of natural gas or other gaseous fuel into a combustion chamber of an engine.

DISCUSSION OF THE PRIOR ART

Natural gas processors and pipeliners have long relied upon large stationary gas engines that were designed and installed in the 1930's and 1940's. These engines have proven to be extremely reliable—unfortunately, their high levels of emissions and poor fuel economy offset their longevity. Known direct fuel injection apparatus and methods in these older gas engines occurs through orifices or nozzles at pressures ($P_{inj}$) that range from about 30 to about 60 PSIG. The pressure in the power cylinder ($P_{cyl}$) during these known injection processes is typically increased by about 20 to about 60 PSIG from an initial ambient or boost pressure. The resulting differential pressure, $dP = P_{inj} - P_{cyl}$, is small, and results in a relatively low velocity fuel jet entering the combustion chamber, which thereby causes poor mixing and an inefficient burn. This inefficient burn produces levels of pollutants that are unacceptable under current environmental requirements.

Recent government mandates call for emissions levels and fuel economies that older engines, in their current forms, are simply not capable of meeting. The only compliance options are to shut down the existing units and replace them with new engines having modern technology, modify the existing equipment utilizing new technology or purchase short-term emissions credits from other producers. All these choices are expensive, in terms of equipment, labor, and downtime. Nonetheless, public pressure and government regulators are forcing the cleanup of the exhaust emissions of these facilities, and suppliers must make critical decisions to comply with the mandates.

With respect to replacement using newer engines, the control methodology employed in modern engines involves many mechanical modifications such as turbochargers, valve overlap, pre-chambers, and computerized ignition systems, all of which increase the price of the engines. With respect to modification of older engines, these modern features simply cannot be economically added to older engine designs. In addition, many older engines are already installed in critical service applications, and upgrade or replacement downtime can quickly become cost prohibitive.

Natural gas is a combination of hydrocarbons that are typically gaseous at atmospheric pressure. Methane is by far the largest component, its presence typically accounting for 90 to 98% of the composition. The remainder is usually composed of ethane, propane, normal and iso-butane, normal and iso-pentanes and heavier hydrocarbons as well as small percentages of $CO_2$ and $N_2$. The composition of natural gas varies significantly with geographic region and type of reservoir, however, in general the physical characteristics are nominal. It is odorless, colorless, and lighter than air, with a specific gravity of 0.58 to 0.70 (air has a specific gravity of 1.22 kg/m$^3$ at standard conditions). A stoichiometric mixture, in which exactly as much air as is necessary to completely oxidizes the fuel is present, typically falls in the range of 16.0 to 17.0 mass part of air to one part of fuel. The width of the range is due to varying compositions of the gas. Natural gas has a comparatively slow flame front propagation speed, only approaching 0.95 fps in a perfect mixture at standard conditions. While critical to the fuel consumption-emissions aspect, natural gas has a fairly wide combustibility range. This is a function of flame front propagation, wherein a mixture that is too lean creates a flame front propagation speed that is too slow to support combustion, while a mixture that is too rich suffers the same problem. In short, any addition of fuel to the mixture causes it to become richer than required to maintain combustion and adversely affects the flame front propagation speed. Conversely, less fuel causes the mixture to become leaner than desired with the same effect. Perhaps more importantly, poorly mixed charges can result in rich and/or lean regions within the mixture. When ignited a rich mixture creates high levels of NOx emissions, and a lean mixture creates high levels of CO and soot pollutants. Unfortunately, the stoichiometric mixture, while easy to ignite and maintain, does not offer the lowest emissions level attainable, but certainly does burn the right amount of fuel to create the optimal heat release.

It is known from combustion science that more efficient mixing of the fuel and air would create a more efficient burn. Historically, it was thought that the mixing occurred naturally as a result of the turbulence created by the air and fuel flowing through the inlet ports into the cylinder and the motion of the piston. However, the inventor has discovered that this type of mixing is not only limited in its efficiency, but in fact creates a non-homogenous mixture in several areas of the cylinder of the combustion chamber. The fact that a fairly rich, at least stoichiometric, mixture was required near the spark plug to promote ignition has induced designers to place fuel injection valves near the spark plugs. This design constraint and known designs of the valve and injection orifices have compromised mixing at the far end of the combustion chamber. Although the resulting combustion mixture usually fires, and meets the initial design criteria for older engines, the burn is extremely inefficient, creates non-homogeneous combustion, resulting in high level of combustion pressure pulsation, and higher levels of undesirable emissions such as oxides of nitrogen and carbon monoxide.

In an attempt to increase burn efficiency and reduce emissions, many designs for new stationary natural gas engines, as well as overhaul designs for older engines, call for the use of high-pressure (from over 150 to about 500 PSIG) fuel supplies and fuel systems. Since older engines have fuel systems designed for a maximum pressure of about 150 PSIG, their fuel injection systems must be completely replaced to accommodate the high-pressure fuel supply. In current upgrades to existing pipeline engines, this aspect alone frequently requires 40 man-days to accomplish.

In addition to the high material, labor, and downtime costs of installing high-pressure fuel injection systems, there are other drawbacks in terms of efficiency and performance. Known high-pressure fuel systems introduce gaseous fuel which is then choked through an orifice, valve, or pipe having constant area duct which acts as the fuel injection nozzle. In some cases, designers have suggested that the resulting gas flow velocities of Mach 0.5 to less than Mach 1.0 generate adequate mixing as a result of the turbulence created by these velocities. However, in reality, flow through these known nozzles is simply choked flow, and as such the resulting fuel jet cannot exceed the speed of sound at the outlet of the nozzle. It is well known to those skilled in the art that the best mixing occurs when the densities of two fluids to be mixed are similar. Despite this fact, natural gas injector designers have used high-pressure (about 300-500 PSIG) gaseous fuel supplies that have a density approximately five times as high as the air that has been compressed in the combustion cylinder chamber. This high density results in a high pressure "pulse" of fuel entering the cylinder without mixing as it passes though the surrounding air. Aside from the mixing problem, the high pressure pulse injects fuel at such a high rate that the injection period must be kept short to avoid too rich a mixture. This creates yet another problem, since the ideal injection period should be as long as possible to extend the interaction of fuel jet with the cylinder wall, piston, and air in the combustion chamber and to create small scale turbulence to completely mix fuel and air.

Another existing limitation which results from the application of high-pressure fuel injection involves the fact that, when dealing with compressible fluids, the sonic velocity of the fluid limits fluid flow through the nozzle. As fuel approaches sonic velocity through a choke flow orifice, a mini-shock wave is created. This shock wave effectively impedes or blocks any additional flow through the orifice, regardless of the upstream fuel pressure.

Therefore, what is needed is a low-pressure fuel injector apparatus that provides superior fuel delivery and combustion chamber mixing for more efficient combustion in gaseous-fueled engines.

SUMMARY OF THE INVENTION

The above complexities and limitations of high pressure fuel injection can be obviated by use of the present invention, which utilizes fluid dynamic principals enunciated by Laval that show that a fluid can be accelerated very efficiently, through a carefully designed converging-diverging nozzle and critical orifice, and that exit flow velocity is relative to the nozzle geometry and pressure on either side of the nozzle. This relationship for non-compressible fluids is linear and fairly straightforward. For compressible fluids, the calculations become quite onerous, but with the advent of high-speed computers, the calculations are now manageable for one skilled in the art.

The apparatus of the present invention is a fuel injector assembly having an annular nozzle with a nozzle passage that includes a converging portion, a critical orifice, and a diverging portion. The converging portion forces fuel through the critical orifice and into the diverging portion, where the fuel expands and is accelerated to a supersonic velocity. In a preferred embodiment, the critical orifice is provided as an annular gap that is created and controlled by the opening of a valve. As the valve opens to admit fuel, an annular gap is created between the circumferential edges of the poppet valve and the surrounding annular nozzle wall, the gap acting as the critical orifice. The nozzle portion below the critical orifice is a diverging nozzle that causes the expansion and acceleration of the under-expanded flow of gaseous fuel flowing through the critical orifice. Using the present invention, relatively low intake pressures of about 50 pounds per square inch gage (PSIG) and yield high-speed (sonic and supersonic) gas flow through the diverging nozzle portion for injection into the combustion chamber. Preferably, the gas flow reaches supersonic velocity, and continues to accelerate downstream of the critical section of the nozzle approaching Mach 1.5 to 2.5 on exit of the nozzle outlet. The actual final velocity of the under-expanded flow is dependent on the ratio of injection pressure and cylinder pressures, dimensions of the critical orifice and diverging nozzle portion, both in terms of diameter and length. Preferably, the diverging nozzle portion of the annular portion of the nozzle has a longitudinal axis of sufficient length so as to protrude into the combustion chamber a distance equivalent to about fifteen (15) to about fifty (50) times the width of the annular gap.

The present invention utilizes a relatively low preselected injection pressure that is always high enough to achieve supersonic injection velocity for the majority of the fuel injection event. The invention provides a converging-diverging nozzle assembly having a critical orifice formed by an annular gap, and gaseous fuel injection methods that utilize low-pressure to produce high-speed sonic and supersonic flow for direct injection of gaseous fuel into a combustion chamber of an engine. Using the present invention, relatively low fuel manifold pressures of about 50 to about 150 PSIG yield high-speed supersonic fuel flow that produces fuel jets surrounded by Mach disks and barrel shock waves from the nozzle outlet and into the combustion chamber. Preferably, the gas reaches supersonic velocity, approaching Mach 1.5 to 3.

The invention is a profiled sonic nozzle, which accelerates fuel flow to above Mach 1. As long as the pressure ratio satisfies $P_{inj}/P_{cyl}>1.59$ (for natural gas, $Cp/Cv=1.31$), supersonic flow can be achieved. For example, if injection pressure $P_{inj}$ is about 85 PSIG, cylinder pressure must not be greater than about 48 PSIG. By using this level of injection pressure, it is possible to realize supersonic flow. To create supersonic gas flow, gas dynamics theory is used to profile the nozzle area. Generally, the nozzle area will have a converging-diverging shape. For any given pressure on the nozzle inlet, there is a resulting acceleration of the flow in the diverging part of the nozzle. At the minimum area of the nozzle, the critical area, the inlet flow reaches a local maximum velocity, which is approaching or at sonic velocity. To accelerate the flow further, the nozzle profile below the critical orifice is diverging.

As described in U.S. patent application Ser. No. 09/728,425 filed Dec. 1, 2000, which application is hereby incorporated by reference, gas dynamic theory is applied to calculate the critical orifice area to provide the required fuel flow through the nozzle to produce supersonic flow at the nozzle outlet at the terminal end of the diverging nozzle portion. For example, known parameters at the nozzle inlet (pressure $P_{inl}$, temperature $T_{inl}$, velocity $V_{inl}$) and the critical orifice can be combined with a predetermined desired outlet velocity (Mach) to define the diverging nozzle outlet area. The ratio of local gas flow speed (V) to the speed of sound (C) (Mach number, $M=V/C$) in the outlet will depend on the ratio of the critical orifice area ($A^*$) to the outlet area ratio ($A_{out}$) ($AR=A^*/A_{out}$). It is recommended the correspondent area ratio (AR) be about 0.3 to about 0.4 to provide a Mach number of about 2.5 to about 3.0, although other ratios can be utilized so long as the resulting flow rate is at least Mach 1.0 or greater so that the flow at the nozzle outlet is supersonic. Depending on the pressure at the outlet, the flow may be over-expanded to create shock waves, after which the pressure will take the value of outlet pressure. In the case of over-expanded flow, the existence and configuration of shock waves produced improves the mixing by increasing entropy and creating micro-scale vortices in the shock waves. These vortices improve the mixing in a larger area and consequently make the combustion mixture more uniform.

The present invention utilizes a diverging nozzle portion disposed below at least one critical orifice to accelerate the flow of gas, thereby allowing use of lower inlet pressures above the critical orifice while still producing sonic or supersonic flow into the combustion chamber. As a result of the supersonic flow, Mach disks and barrel shock waves are created in the fuel jet exiting the diverging portion of the nozzle. When the flow passes these Mach disks and barrel shock waves, that micro-vortices are created and propagated. These micro-vortices mix the fuel with the air at the molecular level, achieving a level of mixing that is not possible using prior art gaseous fuel injection assemblies and methods.

In one embodiment of the present invention, the apparatus is a fuel injector assembly having an annular nozzle and a communicable connection to a low-pressure gaseous fuel supply. The low-pressure fuel supply is preferably natural gas at a pressure between about 50 and about 150 psig. The fuel injector includes at least one nozzle having at least one nozzle passage formed by an annular nozzle wall. The at least one nozzle has a nozzle inlet and nozzle outlet, and the nozzle passage includes a converging portion adjacent the nozzle inlet and a diverging portion adjacent the nozzle outlet. The converging and diverging portions are thus disposed between the nozzle inlet and outlet. A first critical orifice is disposed between the converging and diverging portions of the at least one nozzle passage. Valve means are provided for opening the passage to form an annular gap that acts as a first critical orifice, such that at least a portion of the fuel flow passing through the first critical orifice reaches at least sonic velocity as it travels through the diverging portion of the nozzle passage and enters the combustion chamber of an internal combustion engine. The valve means may be any known means, but is preferably a poppet valve. Preferably, the diverging nozzle portion is configured such that at least one Mach disc is created as the fuel exits the nozzle passage and enters the combustion chamber. The longitudinal axial length of the diverging portion of the annular nozzle is between about fifteen (15) to about fifty (50) times the width of the annular gap that acts as the first critical orifice. Preferably, the longitudinal axial length of the diverging portion of the annular nozzle is between about twenty-five (25) and about thirty-five (35) times the width of the annular gap.

In a second embodiment, the fuel injection assembly further comprises a sonic nozzle port in communication with the first nozzle passage, the sonic nozzle port having a nozzle inlet and nozzle outlet divided by a second critical orifice, and further having a converging portion adjacent the inlet and a diverging portion adjacent the outlet. In this embodiment, the valve means for controlling the first critical orifice simultaneously controls access to the sonic nozzle port such that at least a portion of the fuel flow passing through the first nozzle passage passes through the first critical orifice, while the remaining portion of the gas flow passes through the second critical orifice located in the sonic nozzle port, whereby flow through the assembly reaches at least sonic velocity as it travels through the diverging portion of each nozzle passage before entering the combustion chamber of an internal combustion engine.

The invention further includes methods of directly injecting natural gas or gaseous fuel into an internal combustion engine in a manner that promotes mixing of the gas with air in the combustion chamber. The methods include providing an internal combustion engine and a low-pressure fuel supply of gaseous fuel, and a fuel injection assembly communicably connecting the internal combustion engine to the low-pressure fuel supply. The fuel injection assemblies of the present invention are utilized to practice the preferred embodiments of the methods of the invention.

One advantage of the present invention is that it provides supersonic natural gas flow into a reciprocating piston internal combustion engine to promote excellent mixing with air, resulting in a cleaner burn and lower emissions in gaseous fueled engines operating at low fuel supply pressures below 150 PSIG.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The invention will be further understood from the following description and drawings which show a preferred embodiment of the present invention, wherein.

Wherever possible, the same reference numbers will be used throughout the drawings to refer to the same or like parts.

DETAILED DESCRIPTION OF THE INVENTION

The present invention relates to the injection of gaseous fuel directly into the combustion chamber of a gaseous-fueled engine, and particularly to a gaseous-fueled reciprocating piston engine. FIGS. 1A-3 illustrate several embodiments of the present invention.

Figure 1A:
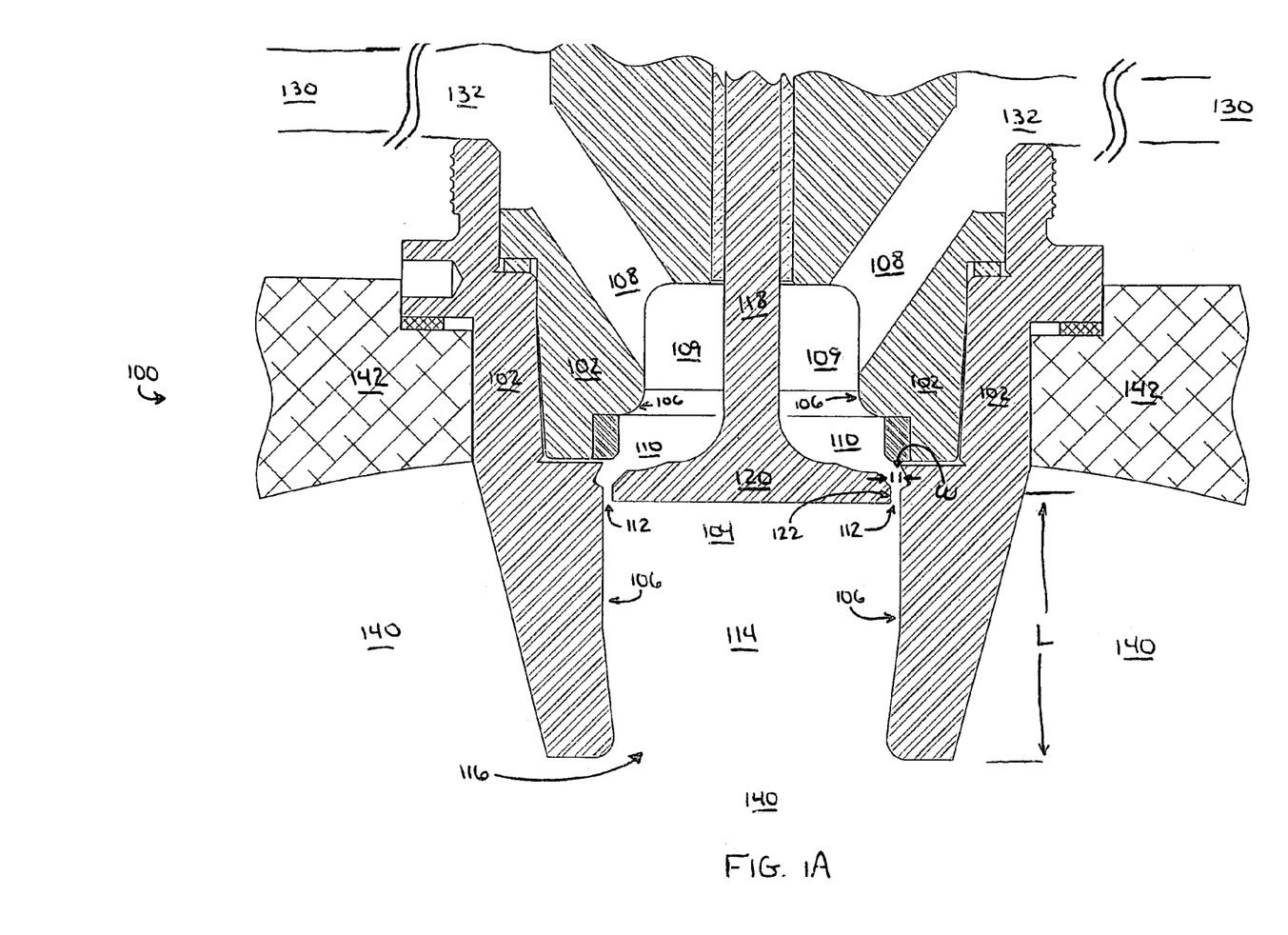
FIG. 1A is a partial side cross sectional view of a first embodiment of the fuel injection assembly of the present invention installed in an internal combustion engine illustrating the valve in the open position.
Figure 1B:
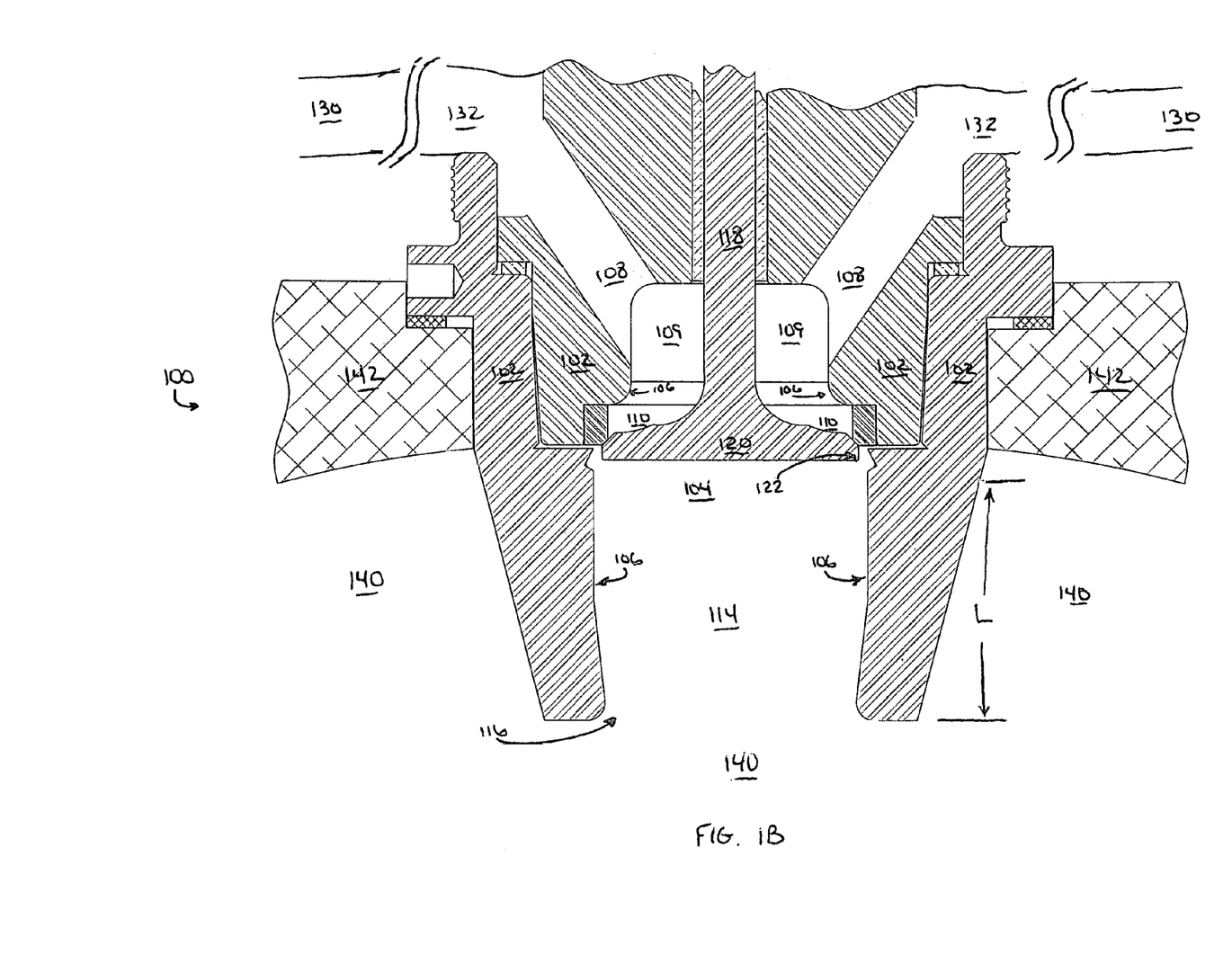
FIG. 1B is a partial side cross sectional view of the fuel injection assembly shown in FIG. 1A illustrating the valve in the closed position.

In one embodiment illustrated in FIGS. 1A and 1B, a fuel injection assembly 100 includes an annular nozzle formed in the fuel injector body 102, the nozzle having an annular wall 106 that surrounds a central nozzle passage 104. The central nozzle passage 104 is communicably connected to a low-pressure fuel supply 130 by a fuel inlet 132. The central passage nozzle passage 104 shown further includes a nozzle inlet 108 which connects the fuel inlet 132 to an upper flow chamber 109. The upper flow chamber 109 shown is generally cylindrically shaped and sized so as not to impede gas flow, however, alternative configurations are contemplated to meet the particular fuel flow and pressure requirements of various engines and applications.

As shown in FIGS. 1A-1B, fuel flow through the nozzle passage 104 is controlled by a valve 118, preferably a poppet valve 118 having a mechanism for opening and closing, such as a valve spring or hydraulic lifters. The annular nozzle wall 106 includes a converging portion 110 and a diverging portion 114, the converging portion 110 and diverging portion 114 separated by a first critical orifice 112. In this embodiment, the first critical orifice 112 is an annular gap created by the opening formed between the circumferential edge 122 of the valve head 120 and the annular wall 106. Preferably, the width of the gap is between about 0.020 and 0.080 inches, and more preferably is between about 0.030 and 0.060 inches. The diverging nozzle portion 114 is disposed below the first critical orifice 112, and terminates in a nozzle outlet 116 that protrudes through the chamber wall 142 of an internal combustion engine to provide fuel injection directly into the combustion chamber 140. In preferred embodiments of this configuration, the diverging portion 114 has a length L that is directly proportional to the width of the gap W formed between any point on the circumferential edge 122 and the immediately surrounding annular wall 106 (as detailed in FIG. 2C). Preferably, the length L is between about fifteen (15) to about fifty (50) times the width W. More preferably, the length L is between about twenty-five (25) and about thirty-five (35) times the width W In an alternative embodiment, the nozzle portion below the valve head 120 includes a second converging portion configured to serve as a transportation stop for the poppet valve 118 when the valve 118 is in the open position, or to prevent excessive valve travel in the event of a valve lifter failure.

In the embodiment of FIGS. 1A and 1B, fuel is introduced from a fuel supply 130 into the nozzle inlet 108 and into the nozzle passage 104. The fuel supply is low-pressure (less than 150 PSI), preferably at between about 50 and about 150 PSI, more preferably between about 60 and about 120 PSI, and most preferably between about 60 and about 95 PSIG. The under-expanded fuel next flows into the upper flow chamber 109 before entering the converging nozzle portion 110. As the valve 120 opens, fuel flows from the converging portion 110 through the critical orifice 112 formed between the circumferential edge 122 and the annular nozzle wall 106. As shown in FIGS. 1A-1B, the circumferential edge 122 is profiled so as to accelerate the flow through the critical orifice 112, such as beveling of the edge 122. As the fuel passes through the critical orifice 112 and enters the diverging nozzle portion 114, the fuel expands and is accelerated to a velocity in excess of sonic. The diverging portion 114 is generally cylindrical or slightly cone shaped, the length and diameter of the diverging nozzle portion 114 being dependent upon the engine geometry (bore, stroke and power) of the application, as well as the size of the critical orifice 112. Other variables include the rate of valve lift and injection time, which may vary from engine to engine. In any embodiment, a positive pressure differential is established between nozzle inlet 108 and nozzle outlet 116 such that inlet pressure is greater than outlet pressure, causing an accelerated fuel flow through the converging nozzle portion 110 through the first critical orifice 112 at or below sonic velocity, resulting in choked flow. Upon entering the diverging nozzle portion 114, the under-expanded flow is again accelerated, this time to speeds in excess of sonic (supersonic), as it exits the outlet 116 and enters the combustion chamber 140. While the actual speed of the exiting flow is related to the outlet area ratio comprised of the diverging portion 114 and the combustion chamber 140, the embodiment of FIGS. 1A-1B has been shown to accelerate the fuel flow to speeds in excess of sonic (Mach 1), to between Mach 1.5 and 2.5. This high-speed flow further produces excellent combustion chamber turbulence. In addition to the adjusting the length of the diverging portion, profiling of the diverging nozzle portion 114, such as including a slope in the annular wall 106 at angle that further encourages the formation and propagation of sonic shock waves in the flow exiting the outlet and entering the combustion chamber. Such shock waves produce a plurality of Mach discs that produce micro-vortices that serve as an extremely efficient mixing mechanism for fuel and air in the combustion chamber.

Figures 2A, 2C:
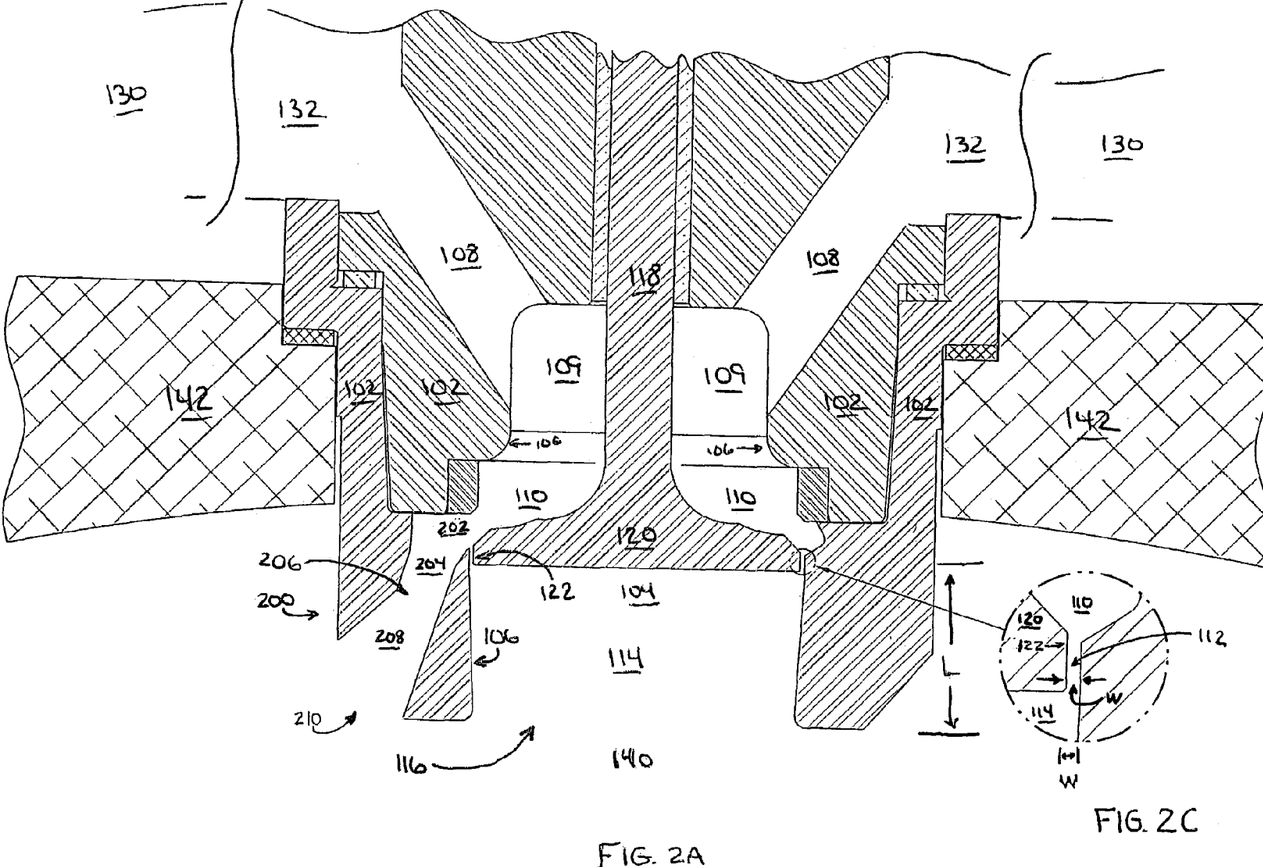
FIG. 2A is a partial side cross sectional view of a second embodiment of the fuel injection assembly of the present invention installed for use in an internal combustion engine, illustrating the valve in the open position.
FIG. 2C is a detailed cross-sectional view of the critical orifice of FIG. 2A, illustrating the geometry of the critical orifice formed with the valve in the open position.
Figure 2B:
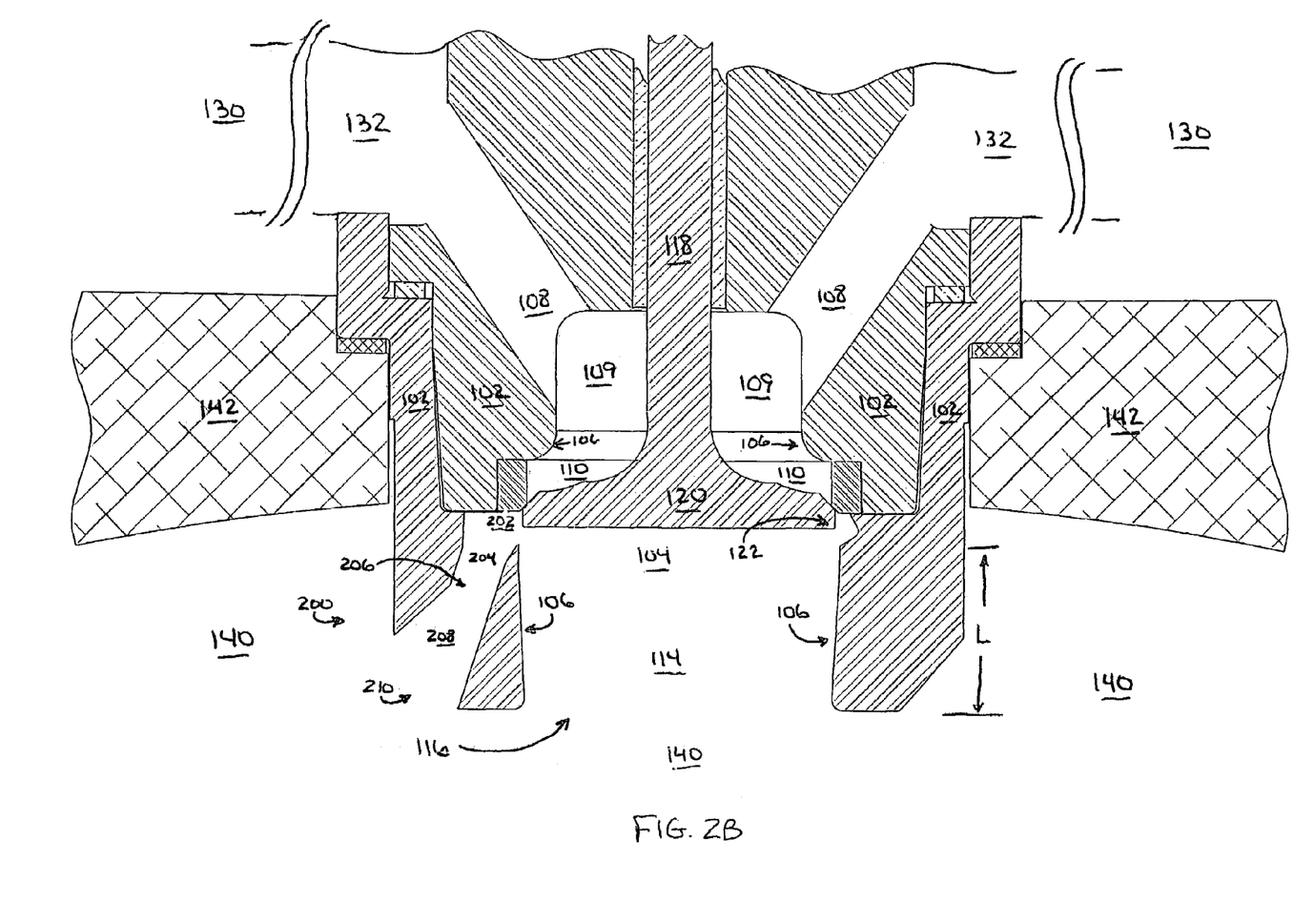
FIG. 2B is a partial side cross sectional view of the fuel injection assembly shown in FIG. 2A illustrating the valve in the closed position.

A second embodiment of the fuel injection assembly is illustrated in FIGS. 2A-2B. In the second embodiment, a second critical orifice is provided below the valve by a sonic nozzle port 200 disposed in the annular wall 106 below the valve head 120. Fuel is introduced from a fuel supply 130 into the nozzle inlet 108 and into the nozzle passage. The fuel supply is low-pressure (less than 150 PSI), preferably between about 50 and about 150 PSIG, and more preferably between about 60 and about 120 PSIG and most preferably between about 60 and about 95 PSIG. The under-expanded fuel next flows into the upper flow chamber 109 before entering a first converging nozzle portion 110. As the valve 120 opens, fuel flows through the first critical orifice 112 formed between the valve's circumferential edge 122 and the annular nozzle wall 106. The valve's circumferential edge 122 is preferably profiled such as by beveling of the edge 122, so as to accelerate the flow through the annual gap that serves as the first critical orifice 112. Some fuel flow passes through the first critical orifice 112 and expands and is accelerated out of the diverging portion outlet 116. However, the remainder of the fuel flow passes through a sonic nozzle port 200 that includes an inlet 202, a converging portion 204 and a diverging portion 208 separated by a second critical orifice 206, and terminating in an outlet 210 that is in direct communication with the combustion chamber 140. In this embodiment, the diameter of the second critical orifice 206 is approximately 30% of the inlet diameter of the converging portion 204. The converging 204 and diverging portion 208 are generally conical, the length and diameter of the diverging nozzle portion 208 being dependent upon the engine geometry (bore, stroke and power) of the application, fuel type, as well as the size of the second critical orifice 206.

Entry of gas flow into the sonic nozzle port 200 provided in this second embodiment is controlled by the valve 120. As illustrated in FIG. 2A, as the valve 118 opens, the valve head 120 opens and fuel enters the sonic port 200 though an inlet 202 that has a converging section 204 communicably connected to a central port passage. The central port passage comprises a diverging section 208 that terminates in an outlet 210 that is in direct communication with the combustion chamber 140 of a reciprocating piston engine. Fuel flowing into the inlet 202 enters the narrowing diameter of the converging section 204, and passes through the critical orifice 206, and is accelerated as it expands upon entering the diverging section 208. Fuel continues to expand in the diverging section 208, and flow becomes accelerated to supersonic velocity as the fuel exits the outlet 210 and enters the combustion chamber 140.

In the embodiment of FIGS. 2A-2B, a positive pressure differential is established between nozzle inlet 108 and nozzle outlets 116 and 210 such that inlet pressure is greater than outlet pressure, causing an accelerated fuel flow through the converging nozzle through the critical orifices 116, 206 below sonic velocity, resulting in choked flow. Upon entering the diverging nozzle portions 114, 208, the under-expanded flow is again accelerated, this time to speeds in excess of sonic. While the actual speed of the exiting flow is related to the outlet area ratios comprised of the diverging portions 114, 208 and the combustion chamber 140, the embodiment of FIGS. 2A-2B has been shown to accelerate the fuel flow to speeds in excess of sonic (Mach 1), to between Mach 1.5 and 2.5 when the positive pressure differential factor, $P_{inj}/P_{cyl}$, is at least 1.59. This high-speed flow further produces excellent combustion chamber turbulence. Additionally, profiling of the diverging nozzle portion, such as including a converging slope in the annular wall at angle further encourages the formation and propagation of the sonic shock waves. Such shock waves produce a plurality of Mach discs that produce microvortices that serve as an extremely efficient mixing mechanism for fuel and air in the combustion chamber.

Figure 3:
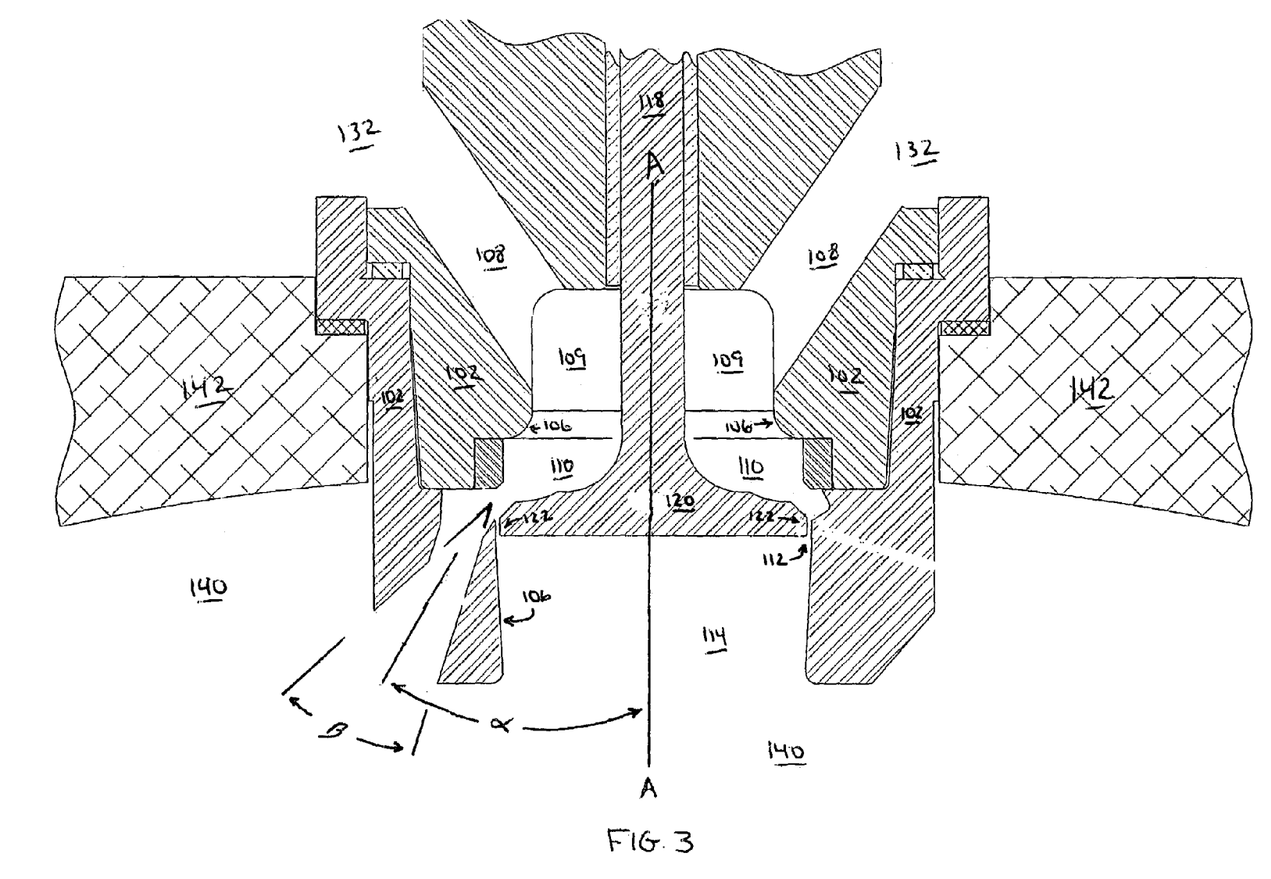
FIG. 3 is a partial cross section view of the fuel injection assembly of FIG. 2A illustrating dimensions related to the sonic nozzle port.

In a preferred example, as shown in FIG. 3, the sonic port 200 is not perfectly parallel to the diverging section 114, but is rather disposed at an angle α offset from the extrapolated centerline A-A of the diverging section 114, the extrapolated centerline A-A passing through the geometric center of the critical orifice. This embodiment encourages a swirling motion to the gas flowing into the combustion chamber 140 to promote mixing. Preferably, the angle α is between about 10 to about 45 degrees. Preferably, the diverging section 208 of the sonic port 200 is substantially cone shaped, and more preferably the walls of the diverging section diverge at an angle β based upon the geometric center of the inlet 202 when the valve is in the open position as illustrated in FIG. 3. Preferably, the angle β is between 15 and 45 degrees.

The fuel injector assemblies of the present invention have been tested in natural gas internal combustion engines, and show substantial improvements in performance and efficiency over conventional injection valve assemblies currently used in the gas pipeline industry.

EXAMPLE

Figure 4A:
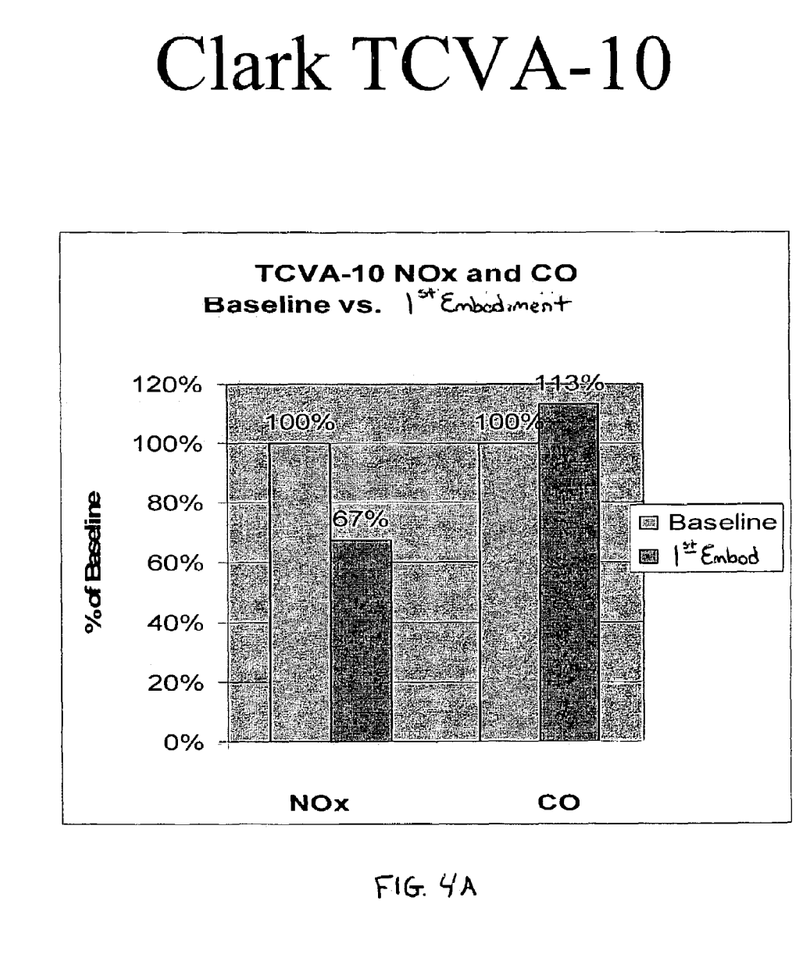
FIGS. 4A and 4B illustrate test results of the fuel injection assembly in the embodiment of FIG. 1A installed on a gaseous-fueled internal combustion engine.
Figure 4B:
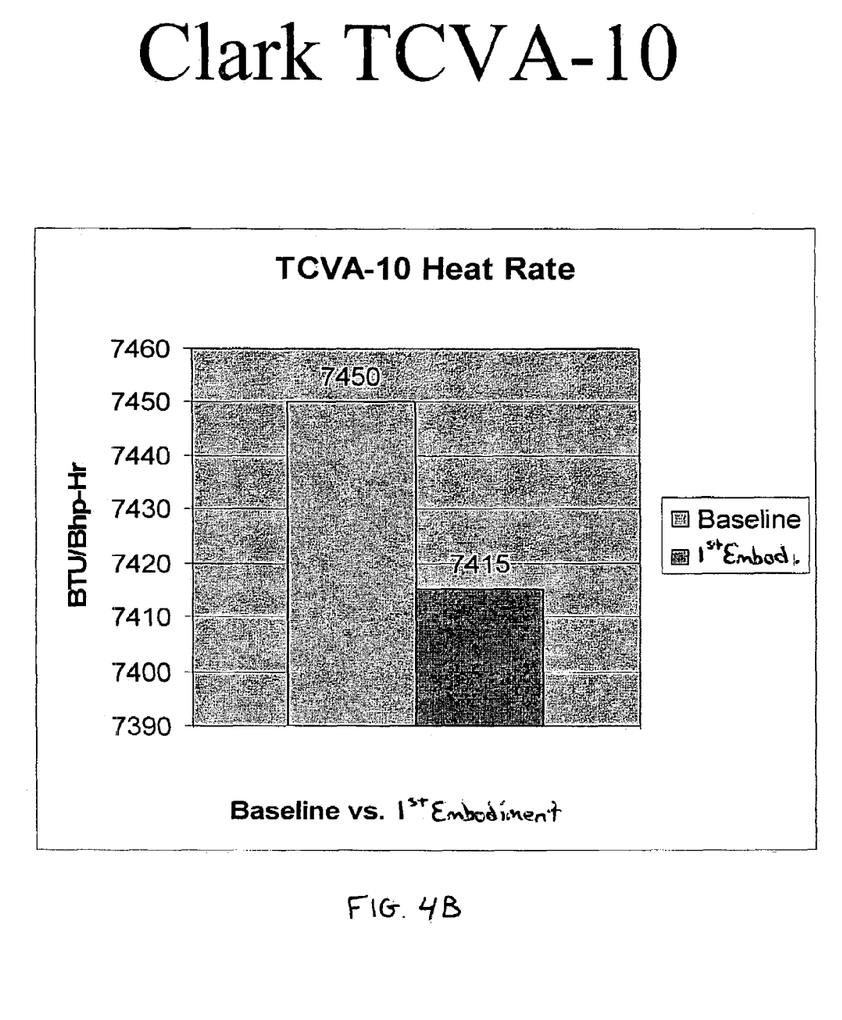

One example involves installation of the fuel injector assembly of FIGS. 1A-1B on a Clark TCUA internal combustion engine. As shown in FIGS. 4A and 4B with the original manufacturer's injection assembly, the engine produced oxides of Nitrogen (Nox) at a rate about 33% higher than with the first embodiment of the nozzle of the present invention. In addition, the fuel rate using the original manufacturer's injection assembly was 7450 BTU per brake horsepower hour. The original injection assembly was then replaced with the first embodiment of the nozzle assembly of the present invention having a critical orifice and diverging nozzle portion designed in accordance with the specifications of that particular engine and model, and the tests repeated. With torque, speed, ignition timing, air manifold temperature and pressure the same as baseline conditions, using the supersonic injection assembly, the NOx emissions were 33% lower per Brake horsepower-hour, and the fuel rate was 7415 BTU per brake horsepower-hour, an improvement of 35 BTU. Carbon monoxide (CO) emissions were also monitored, although such emissions are a secondary pollution consideration as compared to Nox emissions. The combustion stability also improved, as evidenced by an observed reduction in peak cylinder pressure variations from cycle to cycle.

By way of non-limiting example, the supersonic gaseous fuel injector assemblies of the present invention can also be installed on factory specification or modified engines such as Cooper V-250, Cooper GMW, Cooper GMV, Clark TCV, Clark TCVD, Clark TLAD, and others. While these exemplary engines are used in gas pipeline applications, the present invention is applicable to any gaseous fuel injection application involving internal combustion engines, including but not limited to natural gas powered locomotives, marine vessels, automobiles, trucks, aircraft, electrical power generators, and the like.

In alternate embodiments based upon the embodiments of FIGS. 2A-2B, the diverging portion 114 of the nozzle wall 106 may further include a plurality of ports similar to port 200 that allow a portion of the fuel flow to enter the combustion chamber 140 without passing through the nozzle outlet 116. Preferably, the ports are angled so that the fuel flow is generally directed downward toward the combustion chamber 140, thereby encouraging the swirling of fuel flowing from these ports as well as the open end of the nozzle. The holes may be at any angle, but are preferably generally substantially parallel to the motion of the diverging portion 114 piston). However, most preferably, the ports are not perfectly parallel to the main nozzle passage 104 and to each other, but are offset at angles so as to impart a swirl to the collective fuel flow. This addition of an angular flow vector to any of the above embodiments further enhances the mixing of air and fuel in the combustion chamber. Ports may appear in the form of internal porting, fins, or other known means to impart angular flow vectors. The angular momentum imparted in the compressible fuel is conserved through the expansion process and will increase the mixing of the fuel and air.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel injection assembly for direct fuel injection of low pressure gaseous fuel into a combustion chamber of an internal combustion engine, the assembly comprising:
   at least one nozzle having at least one nozzle passage formed by an annular nozzle wall, the at least one nozzle having a nozzle inlet and nozzle outlet, the at least one nozzle passage including a converging portion adjacent the nozzle inlet and a diverging portion adjacent the nozzle outlet, the converging and diverging portions being disposed between the nozzle inlet and outlet;
   a first critical orifice disposed between the converging and diverging portions of the at least one nozzle passage;
   valve means for controlling the first critical orifice such that at least a portion of the fuel flow passing through the first critical orifice reaches at least sonic velocity as it travels through the diverging portion of the at least one nozzle passage and exits the nozzle outlet;
   wherein the first critical orifice is an annular gap formed between the valve means and the annular nozzle wall upon activation of the valve means; and
   wherein a longitudinal axial length of the diverging portion is between about 15 and about 50 times the width of the annular gap that forms the first critical orifice.

2. The assembly of claim 1, wherein the diverging nozzle portion is configured such that at least one Mach disc is created as the fuel exits the nozzle passage and enters a combustion chamber of an internal combustion engine.

3. The assembly of claim 2, wherein the gaseous fuel supply is supplied at a pressure between about 50 and about 150 PSIG.

4. The assembly of claim 3, wherein the gaseous fuel supply is supplied at a pressure between about 60 and about 120 PSIG.

5. The assembly of claim 4, wherein the gaseous fuel supply is supplied at a pressure between about 60 and about 95 PSIG.

6. The assembly of claim 1, wherein the longitudinal axial length of the diverging portion of the at least one nozzle is between about 25 to about 35 times the width of the annular gap that forms the first critical orifice.

7. The assembly of claim 1, wherein the valve means is a poppet valve having a head with circumferential edges configured to create a gap between the circumferential edges and the surrounding annular nozzle wall, the gap forming the first critical orifice when the valve is open, the edges further configured so as to seat against the surrounding annular nozzle wall when the valve is closed.

8. The assembly of claim 1, wherein the at least one nozzle passage includes a second converging portion disposed below the first critical orifice, wherein the second converging portion is configured to serve as a transportation stop for the poppet valve when the valve is in the open position.

9. A fuel injection assembly for direct fuel injection of low pressure gaseous fuel into a combustion chamber of an internal combustion engine, the assembly comprising:
   at least one nozzle having a first nozzle passage formed by an annular nozzle wall, the first nozzle passage having a first nozzle inlet and first nozzle outlet, the first nozzle passage having a converging portion adjacent the first nozzle inlet and a diverging portion adjacent the first nozzle outlet, the converging and diverging portions of the first nozzle passage being disposed between the first nozzle inlet and first nozzle outlet;
   a first critical orifice disposed between the converging and diverging portions of the first nozzle passage;
   a second critical orifice disposed within a second nozzle passage, the second nozzle passage having a second nozzle inlet in communication with the first nozzle passage and a second nozzle outlet, the second nozzle passage having a converging portion adjacent the second nozzle inlet and a diverging portion adjacent the second nozzle outlet, the converging and diverging portions of the second nozzle passage separated by a second critical orifice;
   valve means for simultaneously controlling the first critical orifice and the inlet to the second nozzle passage, such that at least a portion of the fuel flow passing through the first critical orifice reaches at least sonic velocity as it travels through the diverging portion of the first nozzle passage and exits the first nozzle passage, and such that at least a portion of fuel flow passes through the second critical orifice in the second nozzle passage and reaches at least sonic velocity as it travels through the diverging portion of the second nozzle passage and exits the second nozzle passage.

10. The assembly of claim 9, wherein diverging portion of the first nozzle passage and the diverging nozzle portion of the second nozzle passage are configured such that at least one Mach disc is created as the fuel exits the first nozzle passage and the second nozzle passage.

11. The assembly of claim 10, wherein the gaseous fuel supply is supplied at a pressure between about 50 and about 150 PSIG.

12. The assembly of claim 11, wherein the gaseous fuel supply is supplied at a pressure between about 60 and about 120 PSIG.

13. The assembly of claim 12, wherein the gaseous fuel supply is supplied at a pressure between about 60 and about 95 PSIG.

14. The assembly of claim 9, wherein the first critical orifice is an annular gap formed between the valve means and the annular nozzle wall upon activation of the valve means.

15. The assembly of claim 14, wherein the longitudinal axial length of the diverging portion of the first nozzle passage is between about 15 and about 50 times the width of the annular gap that forms the first critical orifice.

16. The assembly of claim 15, wherein the longitudinal axial length of the diverging portion of the first nozzle passage is between about 25 to about 35 times the width of the annular gap that forms the first critical orifice.

17. The assembly of claim 9, wherein the valve means is a poppet valve having a head with circumferential edges configured to create a gap between the circumferential edges and the surrounding annular nozzle wall, the gap forming the first critical orifice when the poppet valve is open, the edges further configured so as to seat against the surrounding annular nozzle wall when the poppet valve is closed.

18. The assembly of claim 17, wherein the first nozzle passage includes a third converging portion disposed below the first critical orifice, wherein the third converging portion is configured to serve as a transportation stop for the poppet valve when the poppet valve is in the open position.

19. A gaseous fueled internal combustion engine, the engine comprising at least one fuel injection assembly for gaseous fuel, each fuel injection assembly comprising:
   at least one nozzle having at least one nozzle passage formed by an annular nozzle wall, the at least one nozzle having a nozzle inlet and nozzle outlet, the at least one nozzle passage including a converging portion adjacent the nozzle inlet and a diverging portion adjacent the nozzle outlet, the converging and diverging portions being disposed between the nozzle inlet and outlet;
   a first critical orifice disposed between the converging and diverging portions of the at least one nozzle passage;
   valve means for controlling the first critical orifice such that at least a portion of the gaseous fuel passing through the first critical orifice reaches at least sonic velocity as it travels through the diverging portion of the at least one nozzle passage and exits the nozzle outlet;
   a fuel connection to a low pressure gaseous fuel supply;
   the fuel supply being operatively connected to the nozzle inlet;
   a combustion chamber being operatively connected to the nozzle outlet;
   wherein the first critical orifice is an annular gap formed between the valve means and the annular nozzle wall upon activation of the valve means: and
   wherein a longitudinal axial length of the diverging portion is between about 15 and about 50 times the width of the annular gap that forms the first critical orifice.

20. The engine of claim 19, wherein the diverging nozzle portion is configured such that at least one Mach disc is created as the gaseous fuel exits the nozzle passage and enters the combustion chamber of an internal combustion engine.

21. The engine of claim 19, wherein the gaseous fuel supply is supplied at a pressure between about 50 and about 150 PSIG.

22. The engine of claim 19, wherein the valve means is a poppet valve having a head with circumferential edges configured to create a gap between the circumferential edges and the surrounding annular nozzle wall, the gap forming the first critical orifice when the valve is open, the edges further configured so as to seat against the surrounding annular nozzle wall when the valve is closed.

23. The engine of claim 22, wherein the at least one nozzle passage includes a second converging portion disposed below the critical orifice, wherein the second converging portion is configured to serve as a transportation stop for the poppet valve when the valve is in the open position.

24. The engine of claim 19, wherein the fuel injector assembly further comprises:
   a second critical orifice disposed within a second nozzle passage, the second nozzle passage having a second nozzle inlet in communication with the first nozzle passage and a second nozzle outlet, the second nozzle passage having a converging portion adjacent the second nozzle inlet and a diverging portion adjacent the second nozzle outlet, the converging and diverging portions of the second nozzle passage separated by a second critical orifice;

and wherein the valve means simultaneously controls the first critical orifice and the inlet to the second nozzle passage, such that at least a portion of the fuel flow passing through the first critical orifice reaches at least sonic velocity as it travels through the diverging portion of the first nozzle passage and exits the first nozzle passage, and such that at least another portion of the fuel flow passes through the second critical orifice in the second nozzle passage and reaches at least sonic velocity as it travels through the diverging portion of the second nozzle passage and exits the second nozzle passage.

* * * * *